United States Patent [19]

Cheng

[11] 3,867,100

[45] Feb. 18, 1975

[54] CARBON BLACK PRODUCTION APPARATUS

[75] Inventor: Paul J. Cheng, Bartlesville, Okla.

[73] Assignee: Phillips Petroleum Company, Bartlesville, Okla.

[22] Filed: Jan. 29, 1974

[21] Appl. No.: 437,654

Related U.S. Application Data

[63] Continuation-in-part of Ser. No. 223,543, Jan. 28, 1972, abandoned.

[52] U.S. Cl. .............. 23/259.5, 423/456, 423/450, 431/347, 431/171, 261/116, 261/117
[51] Int. Cl. ............................. C09c 1/48, F23c 5/06
[58] Field of Search .......... 23/259.5, 252; 431/347, 431/171; 261/117, 116

[56] References Cited
UNITED STATES PATENTS

| 2,553,199 | 5/1951 | Leving | 23/259.5 U |
| 2,571,336 | 10/1951 | Buckholdt | 431/171 X |
| 2,899,374 | 8/1959 | Gomory | 23/288.9 |
| 3,224,488 | 12/1965 | Skonecke et al. | 431/347 X |
| 3,299,940 | 1/1967 | Phillips et al. | 431/347 X |

*Primary Examiner*—James H. Tayman, Jr.

[57] ABSTRACT

A carbon black reactor having contiguous reaction sections has a "teardrop" choke movably positioned in the reaction section to control the properties of the carbon black product.

8 Claims, 8 Drawing Figures

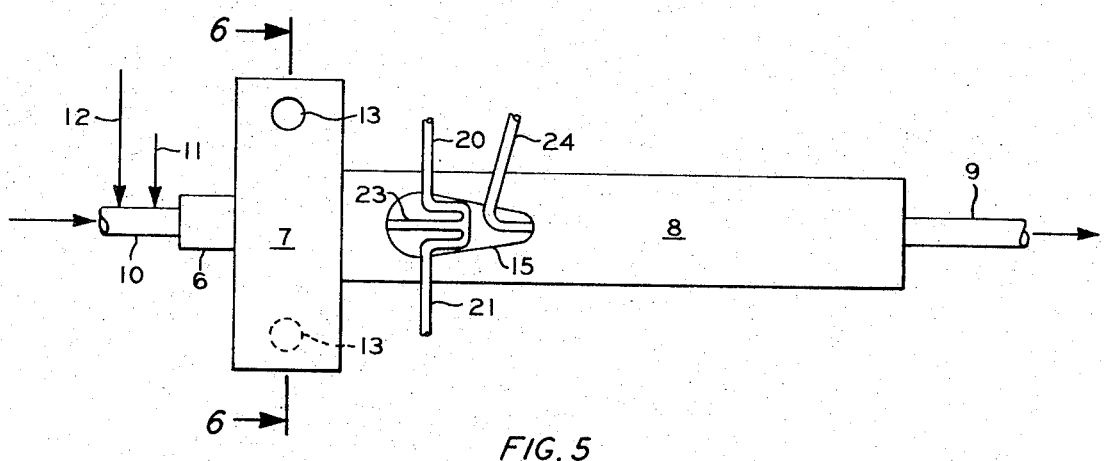
FIG. 5
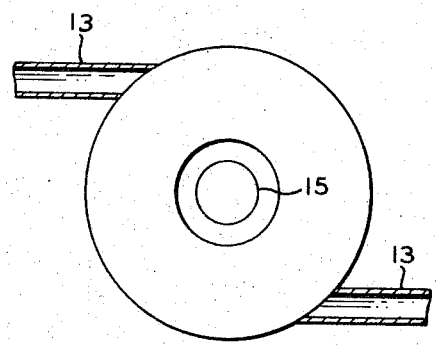
FIG. 6
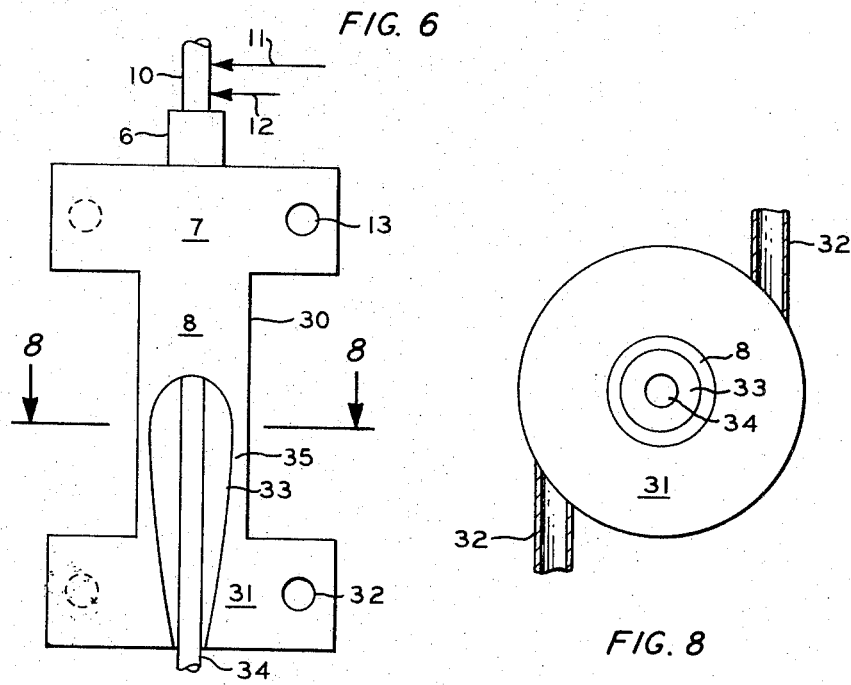
FIG. 7
FIG. 8

CARBON BLACK PRODUCTION APPARATUS

This is a continuation-in-part of my application Ser. No. 223,543 filed Jan. 28, 1972 and now abandoned.

This invention relates to furnace carbon black production.

In one of its more specific aspects, this invention relates to modification of flow patterns within carbon black processes and apparatus to alter carbon black characteristics.

Carbon black is produced in the furnace black process by the pyrolytic decomposition of a hydrocarbon feed by introducing the feed, fuel, a free oxygen-containing oxidant, usually air, into a reactor, bringing the feed to its decomposition temperature by contact with the hot combustion gases and conducting the feed through the reactor under carbon black forming conditions to form carbon black.

Various reactors for use with the same basic process have been developed. Some of these are those reactors described and depicted in U.S. Pat. No. 2,865,717 to Krejci, U.S. Pat. No. 2,878,104 to Reed and U.S. Pat. No. 3,490,869 to Heller, the general nature of those processes being exemplary of that involved in the invention disclosed herein.

Various flow patterns are established in such reactors, some of these flow patterns involving strong back-flow tendencies. Such back-flow tendencies are particularly evident in reactors in which there is positioned a restriction or venturi in the reactor section. The apparatus of this invention is directed toward alleviating these back-flow tendencies in reactors equipped with or without a choke.

According to this invention there is provided a carbon black reactor comprising at least contiguous mixing and reaction sections. A choke is positioned in the reaction section, the choke having a "teardrop" configuration.

The choke of this invention is preferably of a shape resembling a classically shaped teardrop, that is, the choke has the general configuration of a body recognized as offering the least frictional resistance to the flow of fluids around it under free-fall conditions. For purposes of simplification, it will be designated herein as a "teardrop choke."

The choke here concerned can be positioned in both horizontal and vertically positioned reactors and is particularly beneficial when employed, in a modified form, as the shape of certain conduits projecting into reactors for the introduction of reactants thereinto in processes and reactors such as those disclosed in U.S. Pat. No. 2,877,717 to Reed. Because of the extreme conditions to which the choke is subjected, it will be advantageously fabricated of heat resistant refractories and be adapted to be movably positionable along the longitudinal axis of the reactor from the exterior thereof.

The apparatus of this invention will be more easily understood if explained in conjunction with the attached drawings in which FIGS. 1 and 2 illustrate the general configuration, in elevation, of the shape of the chokes herein concerned;

FIGS. 5 and 6 illustrate, in elevation and in cross section, a reactor absent the venturi, the choke being a modified version of that shown in FIG. 1;

FIGS. 7 and 8 illustrate, in elevation and cross section, a modified version of the choke in FIG. 1 employed as a reactant inlet nozzle in a vertically positioned reactor.

Figure 1:
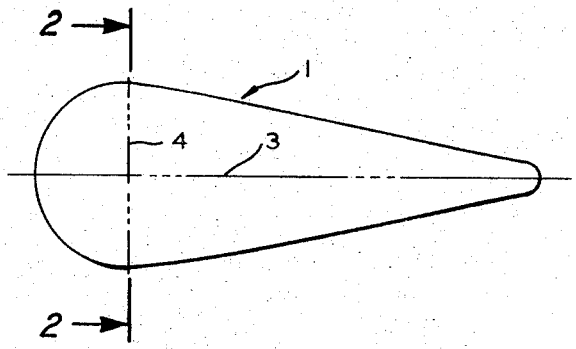
Figure 2:
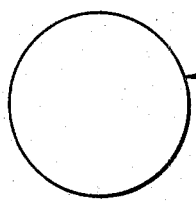

Referring now to FIGS. 1 and 2, there is shown in FIG. 1 a side view of choke 1 in elevation and in FIG. 2 a cross-sectional view of choke 1 through section 2—2 of FIG. 1. Choke 1 has a major axis 3 and a minor axis 4, the length of the major axis being from about two to about 10 times the length of the minor axis.

Figure 3:
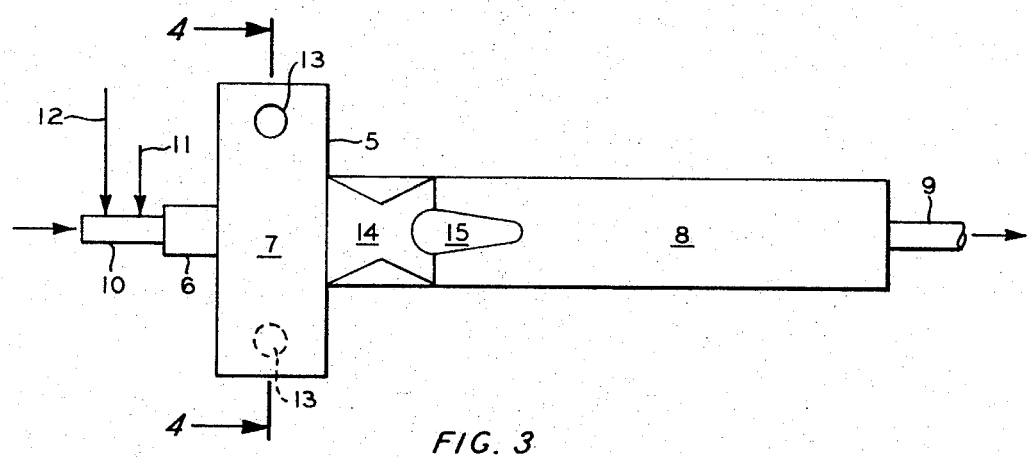
FIGS. 3 and 4 illustrate, in elevation and cross section, a choke positioned in the reaction section of a carbon black reactor in conjunction with a venturi.
Figure 4:
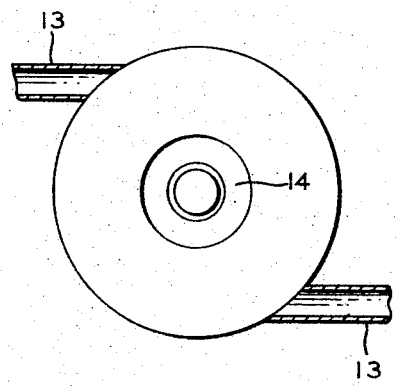

Referring now to FIGS. 3 and 4, there is shown carbon black reactor 5 comprised, optionally, of an axial section 6, a combustion section 7 and a reaction section 8 from which carbon black is removed through outlet conduit 9.

Discharging into the reactor are conduits 10, 11 and 12 which are adapted to discharge any of the reactants, and particularly hydrocarbon feed, fuel, oxidant and hot combustion gases, into either the axial section or into the combustion section, either of which acts as a mixing section.

Combustion section 7 is adapted with precombustion ports 13 through which fuel and an oxidant, or hot combustion gases, or all three, are introduced. These ports open into the combustion section through the circumferential periphery of the reactor and discharge into the section preferably tangentially thereto. By means of those introductions made through conduits 10, 11, 12 and 13 into the combustion section, there is established in this section a reactant mass which is conducted through the reaction section under carbon black forming conditions to form carbon black.

Positioned within the reaction section is venturi 14 which can be of any configuration. Preferably, it will be positioned proximate the entrance to the section although it can extend upstream into the combustion section or can be recessed into the reaction section.

Positioned within the reaction section downstream of the throat of the venturi but within the venturi is choke 15. This choke can be of any size in respect to its diameter and of any length, its diameter and position within the diverging section of the venturi being dependent upon the permissible pressure drop within the system and the properties of the carbon black desired. The choke will be supported in any suitable manner and will preferably have a length within the range of from about one to about three times the diameter of the reaction section. The length of the minor axis of the choke will be within the range of about one-third to about four-fifths of the reaction section diameter.

Referring now to FIGS. 5 and 6, in which like numerals are employed to identify like elements, there is shown choke 15 positioned in a reactor in which no venturi is positioned in the reaction section. The configuration of the choke will be as previously described and, in this embodiment, the upstream end of the choke is positioned from a locus about the mid-point along the length of the longitudinal axis of the combustion section to a locus about two reaction diameters downstream from the entrance into the reaction section.

In FIG. 5, there is depicted that embodiment in which the choke is provided with, optionally, one or a plurality of passageways whereby a gaseous oxidant such as air, or fuel, is passed through the choke and discharged into the reactor.

In the choke depicted in FIG. 5 a plurality of passageways 20 and 21 pass into the choke and unit to form passageway 23 which discharges from the choke at its upstream end. Similarly, a passageway 24 discharges from the downstream end of the choke. By any combination of one or more passageways which are given a circuitous route through the choke, considerable cooling of the choke and considerable preheating of the reactants introduced therethrough can be effected. Such a choke can be employed in a reactor of the configuration of that of FIG. 3.

FIGS. 7 and 8 depict a choke positioned in a reactor such as that described in U.S. Pat. No. 2,877,717 to Reed. In FIG. 7, reactor 30 is shown having inlet conduits 10, 11 and 12 entering combustion section 7 adapted with precombustion ports 13 comparable to the reactor of FIG. 3. Reaction section 8 is terminated with carbon black removal zone 31 adapted with ports 32 from which carbon black is removed.

Extending into the reaction section is choke 33 through which extends conduit 34. Choke 33 can be positioned so as to be supported from conduit 34 or it can be positioned supported on a downstream wall of the reactor. Through conduit 34 can be introduced any of the aforementioned streams conventionally introduced into the reactor.

Choke 33, being of the configuration shown, will form a passageway 35 of reduced area in the reaction section such that turbulence and mixing of the reactant mass occur as it passes therethrough with the elimination of axial backflow.

The apparatus of this invention in its preferred embodiment is that illustrated in FIGS. 3 and 4. A reactor in accordance therewith can be constructed such that the reactant mass is formed in the combustion section which will be 37 inches in diameter and 12 inches long. It will be adapted with 4 inch diameter precombustion tunnels. The reaction section will have a diameter of 10 inches and will be about 10 feet long. A venturi will be positioned therein, its upstream edge coinciding with the downstream wall of the combustion section. The venturi will be composed of two sections whose converging surface will slope inwardly towards an interposed throat, over a distance of about 10 inches at an angle of about 15°. The interposed throat will be 1 inch in length and will have a diameter of 5 inches. The diverging surface will slope outwardly at an angle of about 7.5° over a distance of about 20 inches.

Positioned centrally so as to extend 12 inches into the diverging section of the venturi, measured from the downstream end of the venturi, will be positioned a choke comparable to that of the configuration of FIG. 1. It will have a major axis of 20 inches and a minor axis of 6 inches.

With the reactor so described, various pressure drops will result and different carbon blacks can be produced by varying the relative positions between the venturi and the choke.

It will be evident from the foregoing that various modifications can be made to the method of this invention. Such modifications are considered, however, to be within the scope of the invention.

What is claimed is:

1. A carbon black reactor comprising:
   a. a mixing section adapted with an upstream closing wall and with conduit means for the introduction of reactants thereinto;
   b. a reaction section positioned downstream of and in open communication with said mixing section and adapted with conduit means for the recovery of carbon black from said reactor;
   c. a choke positioned in said reaction section, said choke having a "teardrop" configuration, said choke being adapted with a plurality of conduit means extending into said choke, at least one of said conduit means discharging upstream of said choke and at least one of said conduit means discharging downstream of said choke.

2. The apparatus of claim 1 in which a venturi is positioned in said reaction section and said choke is positioned in said venturi.

3. The apparatus of claim 1 in which said choke is movably positionable within said reactor.

4. The apparatus of claim 2 in which said venturi extends upstream of said reaction section into said mixing section.

5. The apparatus of claim 1 in which the longitudinal axis of said reactor is positioned substantially vertically and said conduit means discharges upwardly into said reactor.

6. The apparatus of claim 1 in which the length of the major axis of said choke is within the range of from about two to about 10 times the length of the minor axis of said choke.

7. The apparatus of claim 1 in which the choke has a length within the range of from about one to about three times the diameter of the reaction section.

8. The apparatus of claim 1 in which the choke has a minor axis within the range of from about one-third to about four-fifths of the diameter of said reaction section.

* * * * *